United States Patent [19]

Safranko et al.

[11] 4,194,924
[45] Mar. 25, 1980

[54] PROCESS FOR RECLAIMING AIRCRAFT FUEL TANK PURGING FLUIDS

[75] Inventors: John W. Safranko, Carmichael; Craig R. Burnett, Folsom; James E. Kilburn, Roseville, all of Calif.

[73] Assignee: The United States of America as represented by the Secretary of the Air Force, Washington, D.C.

[21] Appl. No.: 968,894

[22] Filed: Dec. 13, 1978

[51] Int. Cl.² ............... B08B 7/04; B08B 9/08
[52] U.S. Cl. .................. 134/12; 134/22 R; 134/40; 203/39; 203/DIG. 14; 208/366
[58] Field of Search ............ 134/12, 22 R, 40; 208/366; 196/114; 203/39, 91, 92, 95, DIG. 14; 210/23 R

[56] References Cited
U.S. PATENT DOCUMENTS

| | | |
|---|---|---|
| 2,805,981 | 9/1957 | Cavin et al. .................. 196/114 X |
| 3,505,176 | 4/1970 | Buchsbaum et al. ......... 203/DIG. 14 |
| 3,960,719 | 6/1976 | Bresson ............................ 210/23 R |
| 3,992,290 | 11/1976 | Cook ................................. 210/23 R |

Primary Examiner—Marc L. Caroff
Attorney, Agent, or Firm—Joseph E. Rusz; William J. O'Brien

[57] ABSTRACT

A system for reclaiming the individual constituents of a fuel-contaminated purging fluid by subjecting the fluid to a continuous, closed, flash distillation technique under vacuum coupled with a coalescing oil-water separation procedure.

3 Claims, 1 Drawing Figure

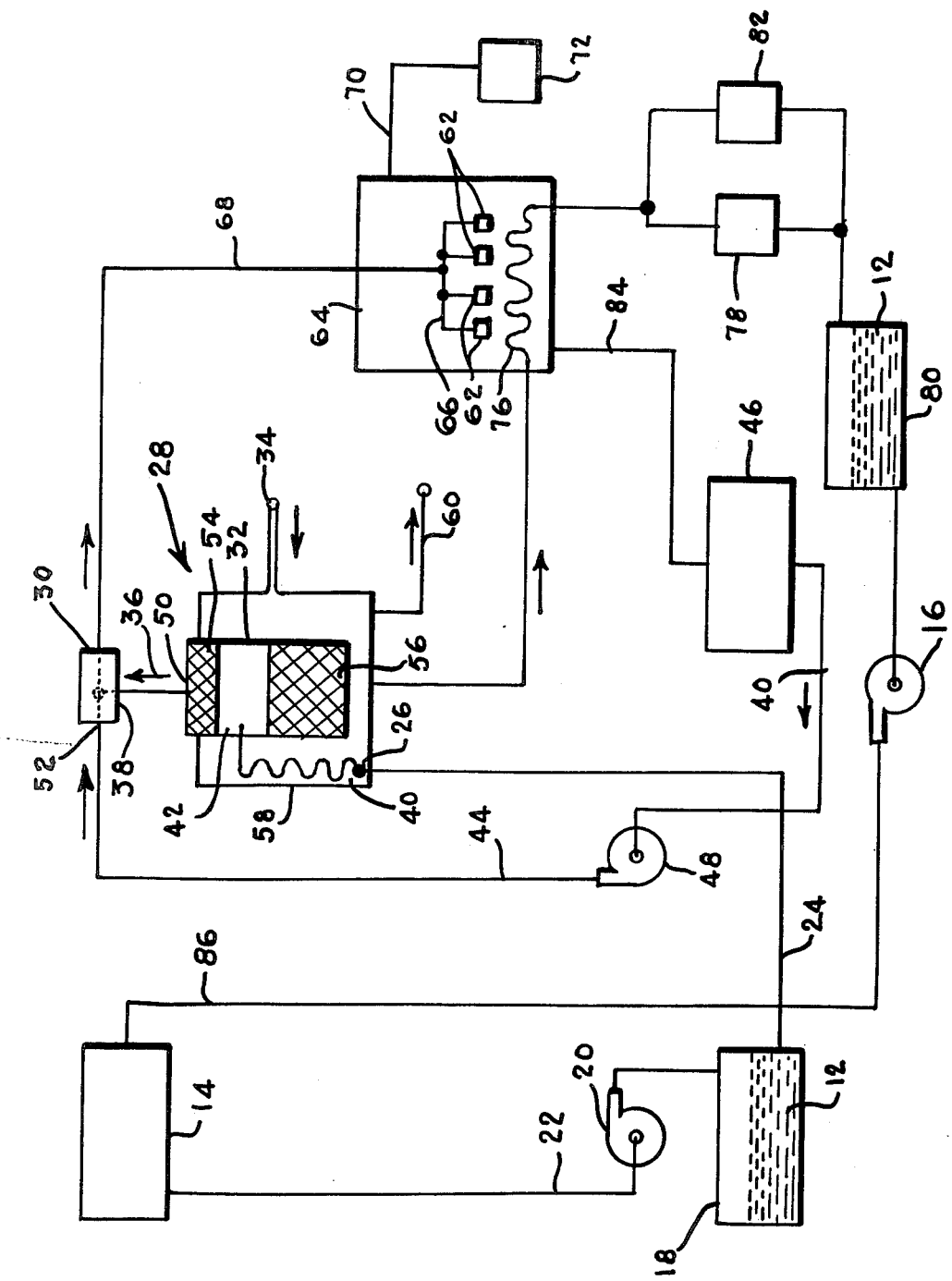

PROCESS FOR RECLAIMING AIRCRAFT FUEL TANK PURGING FLUIDS

STATEMENT OF GOVERNMENT INTEREST

The invention described herein may be manufactured and used by or for the Government for governmental purposes without the payment of any royalty thereon.

BACKGROUND OF THE INVENTION

This invention relates to jet aircraft purging fluids. More particularly, this invention concerns itself with an enclosed, continuous process for separating low flash point hydrocarbons from a purging fluid also containing high flash point hydrocarbons in order to restore both fluids to their original quality for reuse.

Currently, maintenance procedures require the defueling of jet aircraft before the aircraft can be placed in a hanger for repair and maintenance. In the defueling procedure, as much jet fuel as possible, such as JP-4, is removed from an aircraft's fuel system and then a purging fluid or liquid is added to the fuel tank. The purging fluid is used to scavenge or remove the last amounts of jet fuel contained in the fuel tanks by defueling the purging fluid. The JP-4 contaminated purging fluid is then placed in a storage tank.

At the present time, the U.S. Air Force utilizes two purging fluids for defueling jet aircraft. The first purging fluid is JP-5 which conforms to Military Specification Standard T-5624 (the same standard governing grade JP-4 fuel) and is also a jet aircraft fuel. The other purging fluid is one that conforms to Military Specification Standard F-38299. This is a narrow cut of less volatile hydrocarbons and is frequently referred to as Phillips 200, Soltrol 200 or 200 fluid.

Insofar as the purging of the jet fuel itself is concerned, the success of the procedure will be better using a higher flash point purging fluid. The required flash point for Military Specification Standard F-38299 purging fluid is 200° F. minimum. Whereas the flash point requirement for JP-5 is 140° F. minimum. JP-4 jet fuel has a flash point of 0° F. or lower.

The principle reason for purging fuel from a jet aircraft is to render the aircraft less susceptible to explosion when brought into a hanger for repair or maintenance. After defueling jet fuel, such as JP-4, from an aircraft, a residual of JP-4 liquid and its volatile vapors persist in various recesses and inter-connections of the total fuel system. This is particularly true of the smaller fighter type aircraft rather than the larger bombers and cargo planes because in the fighter type aircraft the fuel is not only located in the wing structure but also throughout the fuselage. By refilling a fuel system with purging fluid, the residual JP-4 is mixed and dissolved in the purging fluid. The admixed purging fluid is then drained from the aircraft fuel system leaving behind a residual of purging fluid slightly contaminated with JP-4 to replace the undiluted explosive JP-4. The explosiveness of the aircraft after purging, therefore, is substantially lowered with the degree of explosiveness being a function of the flash point of the admixed purging fluid used. Should a purging fluid be used a second time, the quality of the purging process on the aircraft will not result in as low an explosibility limit as when the purging fluid was first used. This is due to the fact that as the purging fluid is used and re-used, it becomes more contaminated with JP-4 which tends to lower the flash point tremendously.

Another procedure used to minimize the explosive potential of admixed purging fluid is to aerate the purging fluid in the storage tanks between its reuse in the defueling procedure. Aeration removes some of the more volatile constituent hydrocarbons of the JP-4 jet fuel and thus helps to retain the quality of the purging fluid and extend its life for additional purging cycles. This is accomplished, however, at the expense of contaminating the surrounding atmosphere.

Without aeration, a purging fluid will drop in flash point by as much as 20% with one percent JP-4 added. Even with aerating the purge fluid between uses of it, there comes a point at which aeration does not raise or improve the purge fluid's flash point due to an accumulation of intermediate volatile hydrocarbon constituents in the JP-4 jet fuel.

It becomes obvious from the problems referred to above, that the development of a novel and more efficient system for reclaiming purging fluid and the JP-4 contaminant would be of great value. As a consequence, a considerable research effort was undertaken in an attempt to provide a method which minimized the explosive character of reclaimed purging fluid while at the same time overcome the problems of atmospheric contamination.

With the present invention, a closed, continuous, vacuum distillation system has been found which provides for the regeneration of the purging fluid to its original condition, or even to a higher flash point, if desired, and the reclamation of the JP-4 jet fuel rather than allowing it to escape into the atmosphere as a contaminant.

SUMMARY OF THE INVENTION

According to the present invention, the reclamation of JP-4 jet fuel and purging fluid from a mixture of both is accomplished by flash distilling the blended fluids under vacuum in a closed system to vaporize the lighter or JP-4 constituents of the blend followed by the steps of direct water contact cooling condensing of the vapors and then coalescing the condensate in an oil-water separator to effect a layer separation of the JP-4 and water phases. The separated fuel is then distributed to storage facilities while the water is recycled into the reclamation system in order to facilitate the continuity of the continuous process. The non-volatile purging fluid leaves the bottom of the still to be cooled before storaging as reclaimed fluid.

Accordingly, the primary object of this invention is to provide a closed system for reclaiming contaminated purging fluids safely.

Another object of this invention is to provide a process for reclaiming and regenerating fuel-contaminated hydrocarbon purging fluid to its original condition while simultaneously reclaiming the fuel contaminant rather than passing the fuel as a contaminant into the atmosphere.

Still another object of this invention is to provide a process for reclaiming fuel-contaminated hydrocarbon purging fluids that permits their continuing re-use in jet aircraft defueling operations.

The above and still other objects and advantages of the present invention will become more readily apparent upon consideration of the following detailed description thereof when taken in conjunction with the accompanying drawing.

DESCRIPTION OF THE DRAWING

In the drawing:

The FIGURE presents a schematic illustration showing how the process of this invention is carried into effect and its principle features.

DESCRIPTION OF THE PREFERRED EMBODIMENT

The present invention encompasses a novel procedure for reclaiming a used, fuel-contaminated, hydrocarbon purging fluid and regenerating it to its original flash point condition. Also, the procedure accomplishes the effective reclamation of the fuel contaminant by separating it from the purging fluid as a reuseable component rather than allowing it to pass into the atmosphere as any environmental contaminant. The method is carried out by a continuous, vacuum distillation technique in combination with a coalescing oil-water separation procedure.

In order to understand the invention with greater specificity, reference is made to the drawing wherein there is disclosed a system for carrying out the process of the present invention. The system includes a reservoir 80 containing a purging fluid 12 which is injected into an aircraft fuel tank 14 by means of pump 16 and conduit 86 in order to purge the tank 14 of any residual jet fuel. The fuel contaminated purging fluid 12 is then conducted to a fuel contaminated purging fluid storage tank 18 by means of pump 20 through conduit 22. Contaminated fluid 12 is then conducted through conduit 24 and heated coil 26 to a vacuum distillation apparatus 28 by using an eductor or water-operated aspirator 30 which evacuates and establishes a vacuum within the inner shell 32 of the double walled still 28. The still 28, in turn, is heated by means of a steam inlet conduit 34. The eductor 30 can be either water or steam powered (steam powered eductor/ejector requires an after-condenser).

For brevity and ease of explanation, the water eductor method will be discussed in the following paragraphs. Steam eductors/ejectors can be used more successfully for pumping air or other gases that are not very soluble or condensable by ambient temperature water. In the case of hydrocarbon vapors, the advantages of using a water eductor, such as eductor 30, is that the relatively great quantities of water passing through the eductor 30 quickly compress and condense the hydrocarbon vapors 36, such as JP-4 jet fuel, which enter the suction port 38 of the eductor 30. The vapors 36 being condensed then occupy hardly any space in passing through the constriction of the eductor; thus allowing for more capacity than would be obtained if the gas 36 or gases being aspirated into the eductor were non-condensable or non-soluble, such as air.

The eductor 30 creates a vacuum within the inner shell 32 of the still 28 and thus, the eductor 30 also acts as the motivating force for the fluid transfer of the contaminated purging fluid (feed) 12 from the storage tank 18 into the still 28. The feed line 24 enters near the bottom of the still and after coiling around, as indicated at 26, it proceeds upwardly within the steam heated jacket or annulus 40 of the chamber still 28 for a sufficient length to heat the feed liquid 12 to proper flashing temperature. It terminates in the inner shell 32 about two-thirds of the way up from the bottom. A pressure drop in the feed line coiled tubing 26 will exist, especially if a large amount of vaporization occurs in the heated coil 26. At the terminal outlet 42 of the coil 26 (in the vacuum part of the chamber still), the pressure is greatly reduced and flash vaporization occurs. Some additional heat of vaporization is supplied at the expense of a portion of the sensible heat of unflashed liquid. A high efficiency of distillation is gained by this phenomenon. In the continuous vacuum flashing process, the vapor formed and the residual liquid will be in substantial equilibrium and a greater percentage of vaporization will occur by continuous equilibrium vaporization in a combination of the pipe 26 and chamber still 28, at a given temperature than by simple batch or steam distillation to the given temperature as was accomplished by prior art methods.

The operation of the process through the still 28 and eductor 30 is set forth as follows. Water is turned on to flow through the eductor 30 through conduit 44 from cooling tower 46 by means of pump 48. The water pressure may be between 40 psig and 100 psig for most conditions. The suction port of the eductor 30 is connected to the dome 50 of the still chamber 28 and creates a vacuum in the inner shell 32 of the still. The time of evacuation and subsequent distillation operation involving rate of volatiles removal including water, depends on the size of space to be evacuated, size of the eductor and water pressure to the eductor inlet port 52. The distillation operation of flash volatilization additionally depends on temperature. The pressure (vacuum) in the still will vary according to rate of volatiles removed. The dome 50 of the still 28 forms the top closure of the inner shell 32 of the still. The dome portion of the still is filled with a packing material 54, such as ceramic saddles. The function of the packing material is to demist the vapor flow going up into the suction port of the eductor 30. The mist being swept with the true vapors are not necessarily composed of volatile lower flash point hydrocarbons, and the mist is thereby arrested in its upward path of motion by the packing material 54. The packing material 54 allows the volatile constituents of the mist to fractionate off and continue their upward path. The higher weight lowflash point hydrocarbons (purging fluid constituents) fall down off the upper packing 54 into additional packing 56 in the lower half of the still 28 for further fractionation. From the dome 50 closure ring downward the still 28 is jacketted. The jacketted portion 58 of the still 28 is steam heated through inlet 34 and the bottom of the jacket 58 has a steam condensate piping connection 60 to a steam trap not shown for condensate return to the boiler plant or to a drain as desired. The unvaporized liquid drains to the bottom of the inner shell 32 after passing over the bed of packing material 56 (ceramic saddles). The packing material 56 fills the lower half of the inner portion 32 of the still 28 and its purpose is to fractionate off any volatile hydrocarbons dissolved in the less volatile hydrocarbons which will become the reclaimed purging fluid. If JP-5 purging fluid were to be the feed into the still, the temperature could be set to strip off the more volatile components of JP-5. The unvaporized fractions of JP-5 coming down the still would be a product meeting the Military Specification Standards of the Mil Spec F-38299 purging fluid. The vaporized fractions could then be added to a JP-4 stock to a 50—50 blend without offsetting the requirements of JP-4.

The loading of JP-4 vapors to the water eductor and subsequent discharge of the vapors as a completely quenched and condensed liquid is a very efficient and safe method for reclaiming jet fuel such as JP-4. Completeness of quenching or cooling and condensing of JP-4 to liquid state is accomplished quickly and abruptly prior to passage of the JP-4 to the collection part of the system. Prior art type systems employ steam distillation followed by heat exchangers and coolers prior to collection of JP-4 in the final receiving tank. The other systems, though enclosed, operate under conditions where air (particularly oxygen) is not excluded and is allowed to intermix with JP-4 vapors. Occasionally large amounts of air are carried into the system by the process steam. In addition, a hydrocarbon vapor laden atmosphere at high temperature (250° F. approximately) constitutes a dangerous condition for these other systems. Continued recycling of hydrocarbon fuels containing inhibitors and anti-oxidants may in time cause gums and resin formation within the system requiring difficult maintenance to remove.

In steam distillations, if you allow steam to condense in the column, the Phase Rule governing the physical behavior of steam distillation changes. In the vernacular of the Phase Rule if liquid water is present in the fuel still then there will be two liquid phases, oil and water. The presence of liquid water changes the degrees of freedom from two to one: This means that if you change the temperature, you automatically change the pressure. The system, however is designed for two degrees of freedom, which allows no liquid water in the still. This allows for temperature and pressure to be independently variable. Thus, temperature can be raised without causing steep hazardous pressure changes due to steam. In the VDS system, the steam and oil are separated. Additionally in the VDS system the feed can be a mixture of fuel and water in any proportion without creating any hazardous condition. In other words, the steam, if allowed to condense in the system, would form a univariant process. The partial pressure of the steam is fixed at the vapor pressures of water at the temperature of distillation. To avoid the accumulation of a liquid water phase due to condensation of a portion of the open steam, the temperature of distillation has to be chosen, with external heating, so that the partial pressures of steam is less than the saturation pressure of steam for the temperature of operation.

The use of the eductor 30 as a condensor, however, was instigated as a result of an attempt to eliminate atmospheric pollution in the recycling or reuse of the purging fluid. This is accomplished by the process of the invention. In addition, the process reclaims all the JP-4 jet fuel purged out of the aircraft fuel tanks. The direct method of this invention for quenching and condensing the JP-4 fuel vapors through the eductor 30 with cool water has proven very successful as shown by distillation tests made with the JP-4 fuel. Attempts to condense the distillate by holding an air condenser and receiver at minus 90° F. (−90° F.) only succeeded in liquefying and holding about 50% of the JP-4 fuel.

The decrease in vacuum, at the still top, with increased loading of JP-4 vapors gives an indication of the amount of JP-4 removal or volatilization. The greater the rate of volatilization the less vacuum to be read on a gage, not shown on the still 28. The limitation, however, on loading of the JP-4 fuel to an eductor is subservient to the loading of JP-4 that the coalescers 62 can take in the oil-water separator 64. The coalescers 62 are on a manifold arrangement 66 within the oil-water separator 64 and their function is to reconstitute the JP-4 fuel from a finely divided dispersion in water to large oil-like globules that float to the top of the water. A pressure gage, not shown, on the line 68 to the manifold will indicate the back pressure or resistance to increased flow of JP-4 fuel through the coalescers 62. Normal operation will cause a back pressure of less than two pounds per square inch (psig). If the back pressure exceeds this then either the feed flow must be reduced or the design of the manifold be made so that more coalescers may be switched on or placed on stream.

Trial runs on a lab scale model have been conducted. The eductor used was a one-half inch size. To scale up the eductor, the following approximations can be made. For a two inch eductor, the capacity (flow rate) of JP-4 vapors that can be handled after obtaining the capacity of the one-half inch eductor at the determined temperature is computed as follows:

$$(2/0.5)^2 = 16 \text{ times}$$

The trial runs demonstrated that 100% flashing or volatilization occurred when 200 milliliters per minute of JP-4 fuel was fed into the still at 270° F. All of this flow was quenched by a one-half inch eductor with water pressure to inlet of 40 psig. The vacuum gage operated at 17 inches Hg (or about 30−17=13 inches Hg absolute). With no feed, the eductor evacuates the still at 29.5 inches Hg (or 0.5 inches Hg absolute). An equivalent test run using a mixture of Phillips 200 purging fluid (85%) and JP-4 fluid (15%) was also made. To obtain a lowering of vacuum to 17 inches Hg as in a previous test, about 1400 milliliters per minute were fed into the still at 270° F. per minute. Again vaporization of the JP-4 fuel portion of the contaminated purging fluid feed (which constituted about 210 milliliters per minute) caused a vacuum gage reading, at the top of the still, of about 17 inches Hg or 13 inches Hg absolute.

Within the annulus 40 of the still 28 (4 inches diameter by 8 inches long in vertical position) about 21 feet of $\frac{3}{8}$ inch diameter copper tubing, not shown, acted as the coiled tubular heater for the feed. This amount and type of tubing gave a residence volume of 300 milliliters. When a JP-4 fluid feed of 200 ml per minute was heated to 230° F., the tubular heater was capable of flashing or volatilizing 88% of the JP-4 fuel component. The load on the eductor 24 during this operation caused the vacuum gage to read about 18 inches Hg (about 11.5 inches Hg absolute). With a fluid feed of 200 mil per minute and a still temperature of 190° F., the percent of JP-4 fuel component flashed was 71%. The vacuum gage gave a reading of 21 inches Hg (or about 8.5 inches Hg absolute). At this same temperature of 195° F., when flow rate of feed was cut down to 135 ml per minute, the vacuum reading was 23.5 inches Hg (about 6 inches Hg absolute) and about 88% JP-4 component had flashed.

The volatile hydrocarbons of the jet fuel and the non-volatile hydrocarbons of the purging fluid are separated in the still 28 and both are transported to the oil-water separator 64 via different conduits. The volatiles, or fuel components, leave the still 28 at the top and are immediately quenched in the eductor 30. The volatile (JP-4) hydrocarbons, become suspended in water, then pass through conduit 68 to the coalescing filter cartridges 62 in the oil-water separator 64 to re-group as oily globules that float to the top of the water forming an oily layer. The excess of the oily layer of JP-4 fuel flows out of the separator 64 directly by means of conduit 70 to storage tank 72 for reuse. The purging fluid leaves the bottom of the still 28 through conduit 74 and by gravity flows through copper coiled tubing 76 in the water layer of the oil-water separator 64. A continuous water supply from the eductor accepts the transfer of heat gained by the purging fluid from the still 28. When properly designed, the purging fluid is cooled from the still at 270° F. to about 90° F. before it is transferred by gravity from the separator 64 to one of two vacuum receiving tanks 78 and 82. To prevent vacuum loss surges, the receiving tanks are evacuated by a separate vacuum system, not shown, and not by the eductor 30 used for evacuating the still 28 and quenching the volatilized hydrocarbons of JP-4 jet fuel. The tanks 78 and 82 are operated in conjunction to each other intermittently. When one of the tanks is receiving the purging fluid, the other has already been filled and has subsequently been vented to the atmosphere and is discharging its contents of purging fluid to storage tank 80.

The water portion in the oil-water separator is removed by gravity from the separator 64 and conducted by conduit 84 to cooling tower 46. The water can then be recycled through the system by means of conduit 40 and pump 48 to the eductor 30.

The present invention constitutes a closed, continuous, flash distillation technique devised primarily at preventing atmospheric pollution in the safest possible manner.

The heated fluid is within an enclosed system without air or oxygen to cause a dangerous condition. For instance, no flow is possible if the eductor 30 is not operating. Yet when the eductor 30 is operating, then the desired vacuum condition is automatically achieved. Thus, a safe operation is automatically achieved. The presence of water, in any proportion to fuel feed, will cause no pressurization hazards.

The very volatile and hard to condense light hydrocarbons present in the JP-4 jet fuel are thoroughly mixed and condensed quickly by being compressed in the water in the eductor 30. The usual methods of distillation use condensers and heat exchangers following the still. This dispels the safety aspect of distilling light hydrocarbons because the vapors of the explosive hydrocarbons are present throughout such systems and when in contact with air or oxygen uncertainties exist regarding their explosive potential. Previous testing of prior art devices have shown that only about 50% of the volatile JP-4 fractions can be condensed and collected even when holding the condenser at −90° F., consequently the vapors linger in the collection portions of such systems.

The process of this this invention can safely separate a mixture of hydrocarbon components into two separate series of hydrocarbons, as measured by their volatility or non-volatility at any level of hydrocarbon volatility. This invention finds particular application in the separating of the very low flash point jet fuel JP-4 volatile constituents from a JP-5 purging fluid leaving an unvaporized product which conforms to the standards of purging fluid MIL-F-38299. This invention can be modified also to effectively separate the volatile constituents into several products by utilizing a fractionating column as a portion of the upper part of the still 28. It can be used also for de-watering or concentrating liquids such as fruit juices or plating solutions. Very little, if any, heat is required in de-watering.

In plating procedures, the rinse waters carry off the plating solutions which can be recycled and re-used if re-concentrated. In de-watering fruit and vegetable juices, freeze drying can be incorporated when the flashing still is used in combination with supercooled receiving tanks, as stated above, the invention is particularly adaptable for use in the reclamation of waste solvents by utilizing a conventional fractionating column in combination with the flash distillation still 28.

While the invention has been described by reference to a specific embodiment thereof, it should be understood that the disclosure of the invention is for the purpose of illustration only and is not intended to limit the invention in any way. It is a simple, continuous, closed distillation system which separates chemical components, such as hydrocarbons, in a low pressure environment.

What is claimed is:

1. A continuous method for reclaiming and regenerating the individual components of a fuel contaminated, composite, liquid purging mixture which comprises the steps of:
    a. introducing a high flash point hydrocarbon purging liquid into an aircraft fuel tank containing residual amounts of a low flash point hydrocarbon jet fuel to form a fuel-contaminated purging fluid;
    b. passing said contaminated purging fluid through a colled conduit in the heated jacket section of a flash distillation still while simultaneously pre-heating said fluid to partially vaporize a portion of the said fluid;
    c. evacuating the inner shell portion of said distillation still by means of a water-powered aspirator to create a vacuum in said shell portion;
    d. heating said contaminated purging fluid while passing through the coil within the jacket of the still and passing the vapor laden portions of said fluid upwardly into said evacuated shell portion;
    e. maintaining controlled conditions of pressure and temperature within said shell portion sufficiently to flash vaporize the highly volatile, low flash point, hydrocarbon fuel component;
    f. passing the flash vaporized component upwardly through a ceramic saddle packing to demist said flash vaporized component and remove any entrained non-volatile components;
    g. drawing the demisted vapors upwardly into a water-powered aspirator to cool, condense and compress said vapors into a liquid phase that is suspended in water;
    h. passing said liquid phase emulsified in water through a manifold of coalescing filters arranged within a water-oil separator to separate the low flash point liquid fuel component into a separate, distinct, oily layer floating on the top surface of a water layer;
    i. discharging and passing said fuel component into a storage reservoir while simultaneously recycling and passing said water to said water-operated aspirator for re-use; and
    j. passing the relatively, non-volatile, high flash point, hydrocarbon purging fluid remaining in the bottom portion of said distillation still through a ceramic saddle packing to fractionate off as vapor any dissolved volatile hydrocarbons and then to pass the hot reclaimed purging fluid through the bottom of the still and into a coiled conduit which passes through said oil-water separator for cooling said purging fluid before alternately passing separate portions of said purging fluid into vacuum operated receiving tanks for subsequent introduction into a common storage reservoir.

2. A method in accordance with claim 1 wherein said distillation temperature is maintained at about 210° to 280° F. and said pressure will vary from 0.5 inches Hg absolute to approximately 15 inches Hg absolute depending on rate of removal of volatile.

3. A method in accordance with claim 1 wherein said temperature is lower than 210° F. and said pressure will vary depending on rate of removal of volatiles including water.

* * * * *